US011553793B2

(12) United States Patent
Schlanbusch et al.

(10) Patent No.: US 11,553,793 B2
(45) Date of Patent: Jan. 17, 2023

(54) MOUNTING DEVICE FOR A DRAWER FRONT

(71) Applicant: VikingBad Holding AS, Grimstad (NO)

(72) Inventors: Kristian Schlanbusch, Grimstad (NO); Peder Østmoe, Grimstad (NO)

(73) Assignee: VikingBad Holding AS, Grimstad (NO)

(*) Notice: Subject to any disclaimer, the term of this patent is extended or adjusted under 35 U.S.C. 154(b) by 0 days.

(21) Appl. No.: 17/413,079

(22) PCT Filed: Dec. 18, 2019

(86) PCT No.: PCT/NO2019/050280
§ 371 (c)(1),
(2) Date: Jun. 11, 2021

(87) PCT Pub. No.: WO2020/130844
PCT Pub. Date: Jun. 25, 2020

(65) Prior Publication Data

US 2022/0022648 A1 Jan. 27, 2022

(30) Foreign Application Priority Data

Dec. 21, 2018 (NO) .................................... 20181669

(51) Int. Cl.
*A47B 88/95* (2017.01)
*A47B 88/90* (2017.01)

(52) U.S. Cl.
CPC ............ *A47B 88/95* (2017.01); *A47B 88/941* (2017.01); *A47B 2088/951* (2017.01)

(58) Field of Classification Search
CPC .. A47B 88/95; A47B 88/941; A47B 2088/951
(Continued)

(56) References Cited

U.S. PATENT DOCUMENTS 1,432,349 A 10/1922 McFarland
2,708,088 A 5/1955 Steinke
(Continued)

FOREIGN PATENT DOCUMENTS

CN 108119445 6/2018
DE 1871426 5/1963
(Continued)

OTHER PUBLICATIONS

Norwegian Search Report for No. 20181669, dated Jun. 25, 2019.
(Continued)

*Primary Examiner* — James O Hansen
(74) *Attorney, Agent, or Firm* — Andrus Intellectual Property Law, LLP

(57) ABSTRACT

A mounting system is for mounting a first panel to a second panel under an angle. The mounting system has: i) a bracket for being mounted to the first panel; ii) a holder being configured for being mounted to the second panel and having an opening, wherein the opening has a first part for receiving the bracket in an unlocked position and a second part being narrower than the first part, the second part being configured for receiving the bracket in a locking position, and iii) a locking member for holding the bracket in the locking position after that it has been inserted in the holder and slid into the locking position. The present disclosure allows for a click-and-lock technology for mounting panels.

11 Claims, 8 Drawing Sheets

(58) Field of Classification Search
USPC .......................................... 312/265.5, 348.4
See application file for complete search history.

(56) References Cited

U.S. PATENT DOCUMENTS

| | | | |
|---|---|---|---|
| 4,025,216 A | 5/1977 | Hives | |
| 5,895,103 A * | 4/1999 | Huber .................... | A47B 88/95 312/348.4 |
| 6,109,819 A | 8/2000 | Welch | |
| 2004/0000852 A1 * | 1/2004 | Lam Harn ........... | A47B 88/956 312/348.4 |
| 2010/0102692 A1 | 4/2010 | Haemmerle et al. | |
| 2011/0304249 A1 | 12/2011 | Lai | |
| 2014/0202101 A1 | 7/2014 | Hurst | |
| 2015/0115788 A1 * | 4/2015 | Ng ......................... | A47B 88/95 312/348.4 |

FOREIGN PATENT DOCUMENTS

| | | |
|---|---|---|
| DE | 102007049940 | 4/2008 |
| DE | 102016116178 | 3/2018 |
| EP | 2982268 | 2/2016 |
| FR | 2304808 | 10/1976 |
| FR | 2346590 | 10/1977 |
| GB | 2101879 | 1/1983 |
| WO | 2007043937 | 4/2007 |
| WO | 2016172750 A1 | 11/2016 |

OTHER PUBLICATIONS

International Search Report and the Written Opinion for PCT/N02019/050280, dated Jun. 4, 2020.

European Search Report for corresponding European Application No. EP3897297 dated Aug. 1, 2022.

* cited by examiner

MOUNTING DEVICE FOR A DRAWER FRONT

CROSS-REFERENCE TO RELATED APPLICATIONS

This application is the U.S. national stage application of International Application PCT/NO2019/050280, filed Dec. 18, 2019, which international application was published on Jun. 25, 2020, as International Publication WO 2020/130844 in the English language. The International Application claims priority of Norwegian Patent Application No. 20181669, filed Dec. 21, 2018. The international application and Norwegian application are both incorporated herein by reference, in entirety.

FIELD OF THE INVENTION

The invention relates to a mounting system for mounting a first panel to a second panel under an angle. The invention further relates to individual parts of such mounting system.

The invention also relates to furniture comprising such mounting system.

BACKGROUND OF THE INVENTION

For professional furniture assembly time is a vital cost element and there is a need to reduce the time it takes to assemble such products. Screwing parts together is one of the time-consuming parts of the assembly process.

Some solutions that do not require screwing or gluing parts together have been disclosed up to now.

For example, granted patent EP2,982,268B1 discloses a drawer for furniture or the like, comprising a bottom wall, a front wall, two side walls and a rear wall, wherein said bottom wall is provided with at least one protrusion and in that said front wall is provided with at least one support adapted to cooperate and coupling with said protrusion.

Patent application US2011/0304249A1 discloses a modular drawer box structure, i.e. a plastic drawer box. Its volume of packaging material can be largely reduced so that reduces the transportation and warehousing costs. The bottom plate and two side plates of the drawer box can be integrated and folded, the connective interface between the bottom plate and two side plates is placed with V-type folded slot for two side plates forming through upward turnover. Different embedded pieces are individually extended and installed. Through those embedded pieces, intercalation of additional face plate and back plate can be individually established. The embedded slots are installed at two laterals and the lower side of inner surfaces of the face plate and the back plate with corresponding embedded holes placed at the outer side of the embedded slots, thus connect the bottom plate, two side plates, the face plate and the back plate.

The problem with the existing screw-free and glue-free mounting solutions is that they still lack robustness, i.e. they do not result in very firm connections between said parts. A further problem is that the way of connecting said parts together is not very convenient for assembling furniture like drawers.

In view of the above described problems there is a need to further develop screw-free and glue-free mounting techniques in furniture.

SUMMARY OF THE INVENTION

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect the invention relates to a mounting system for mounting a first panel to a second panel under an angle. The mounting system comprises:

- a bracket having a mounting portion and a head portion connected to the mounting portion via a narrowed neck portion, wherein the mounting portion, the head portion and the narrowed neck portion are flat and define a shape extending in a first plane, wherein the head portion points in an axial direction of the bracket within the first plane, wherein the mounting portion is configured for being mounted to the first panel;
- a holder having an opening having a shape being defined in a further plane, the holder being configured for being mounted to the second panel, wherein the shape of the opening comprises a first part for receiving the head portion of the bracket in an unlocked position, wherein the holder and the bracket are configured such that, in operational use of the mounting system, the bracket may be inserted in the opening in such a way that the axial direction of the bracket is under an insertion angle with the further plane, wherein the shape of the opening comprises a second part adjacent to the first part and being narrower than the first part, the second part being configured for receiving the narrowed neck portion in a locking position when the bracket is slid from the first part to the second part in a direction substantially parallel to the further plane, and
- a locking member for holding the bracket in the locking position after that it has been inserted in the holder and slid into the locking position.

The effects of the features of the mounting system in accordance with the invention are as follows. First of all, the bracket is conveniently formed for being inserted into the opening of the holder, wherein the bracket is held under an angle with the holder. The opening extends in the further plane of the holder and the shape of the opening allows for the bracket to be inserted, because of its first part having a width that is at least as wide as the head portion of the bracket. The opening of the holder is further shaped with a second part that is narrower than the first part, but still at least as wide as the neck portion of the bracket. This allows the bracket to be inserted and slid from the unlocked position to a further position in a direction parallel to the further plane of the holder, where the locking members provides for a locking effect by keeping the bracket in that place once slid to in the further position, i.e. the locking position. In operational use in an embodiment of the invention the bracket is conveniently mounted on the first panel and the holder and locking member are conveniently mounted on the second panel, and the second panel is conveniently mounted to the first panel by a sliding movement of the second panel parallel to the plane of the first panel and thereby provides an angled click-lock system.

The invention allows for a fast and robust click-and-lock technology for mounting said panels. The invention thereby reduces assembly time, eliminates the use of tools and glue in this step of the assembly process, and overcomes important challenges associated with existing furniture mounting technology. Fast, safe and easy installation of furniture is an important advantage in the furniture industry. The invention results in fast and efficient assembly and locking together two panels under an angle, such as a drawer front panel to a drawer bottom board. The angled click-lock solution of the invention is in clear contrast with known in-plane click-lock systems wherein one panel is translated in a direction parallel to the plane of the other panel to obtain a click-lock. The mounting system of the invention provides for both a firm connection in lateral and orthogonal directions, whereas the in-plane click-lock systems provide only a firm connection in one of those directions.

In order to facilitate understanding of the invention one or more expressions are further defined hereinafter.

Wherever the word "panel" is used, this must be interpreted as equivalent to plate, board, sheet, layer, lamina, pane, slab, and plank. In the current application all these words indicate a generally plate of material (planar or curved) that serves to define a boundary or side of a drawer or piece of furniture. There may be holes, dents, or decorative trenches, slits and openings in this boundary. In an embodiment of the locking system in accordance with the invention the mounting portion of the bracket is wider than the head portion. Making the mounting portion wider than the head portion facilitates insertion of the bracket into the holder in that the mounting portion can be pressed against the holder, while the depth in which the head portion is inserted is then only defined by the dimension of the neck portion and the head portion, which then may be conveniently dimensioned to match with the dimensions of the holder.

In an embodiment of the locking system in accordance with the invention the locking member comprises a resilient member that is positioned within the opening in operational use and being configured for being pressed in when the bracket is being slid from the unlocked position to the locking position and for taking in its original position when the bracket is fully in the locking position for providing a stable support under the bracket, wherein the resilient member is configured and placed such that it is accessible through the opening for allowing being pressed in by a finger or tool thereby releasing the bracket and allowing it to be slid back to its unlocked position. This design of this locking member in this embodiment constitutes a very convenient way of locking the bracket in its locking position. And also it allows for a very convenient unlocking of said bracket, such that it can be moved to its unlocking position and taken out.

In an embodiment of the locking system in accordance with the invention the locking member and the holder are formed as separate parts that are configured to be mounted together. This embodiment concerns a first main variant of the design of the locking system. In this embodiment all parts of the locking system may be manufactured separately and sold separately as parts of a three-part locking system.

In an embodiment of the locking system in accordance with the invention the locking member and the holder are formed as one part. This embodiment concerns a second main variant of the design of the locking system. In this embodiment all parts of the locking system may be manufactured separately and sold separately as parts of a two-part locking system.

In all embodiments all parts of the locking system may be manufactured using techniques selected from the group comprising: 3D-printing, moulding, CNC machining, casting, handmade, carving, cutting, extrusion and stamping, assembly by multiple components and/or a combination of the above.

In a second aspect the invention relates to the bracket in the mounting system in accordance with the invention.

In a third aspect the invention relates to the holder in the mounting system according to the locking member in the mounting system in accordance with the invention.

In a fourth aspect the invention relates to the locking member in the mounting system in accordance with the invention.

The bracket, the holder and the locking member in accordance with the second, third and fourth aspect of the invention belong together as a plug belongs to a socket. The holder and the locking member may be integrated into once part.

In a fifth aspect the invention relates to furniture comprising a first panel and a second panel mounted together under an angle by the mounting system according to any one of claims 1 to 5, wherein the first panel is provided with the bracket and the second panel is provided with the holder and locking member. Clearly one of the major application areas of the invention is furniture. Whereas prior art solutions requires time-consuming cumbersome screwing and gluing of parts, it is the invention which provides for ultra-fast and robust mounting panels together under an angle. One of said panels is provided with the bracket and the other one is provided with the holder and the locking member (in one piece or in two separate pieces mounted together).

In an embodiment of the furniture in accordance with the invention the first panel is also provided with side panels, wherein the second panel is provided such that it abuts both the first panel as well as the side panels for forming a container or drawer. This embodiment concerns a very advantageous application area of the invention, where the second panel is mounted on the first panel having the side panels already mounted. The side panels conveniently determine the angle between the first panel and the second panel as the second panel will rest on the side panels when being mounted.

In an example application the first panel is the bottom of a drawer or box and the second panel is the front panel. Between the second panel and the side panels there may be provided further mounting systems to establish a firm connection between them.

BRIEF INTRODUCTION OF THE DRAWINGS

In the following is described example of a preferred embodiment illustrated in the accompanying drawings, wherein.

DETAILED DESCRIPTION OF THE EMBODIMENTS

Figure 1:
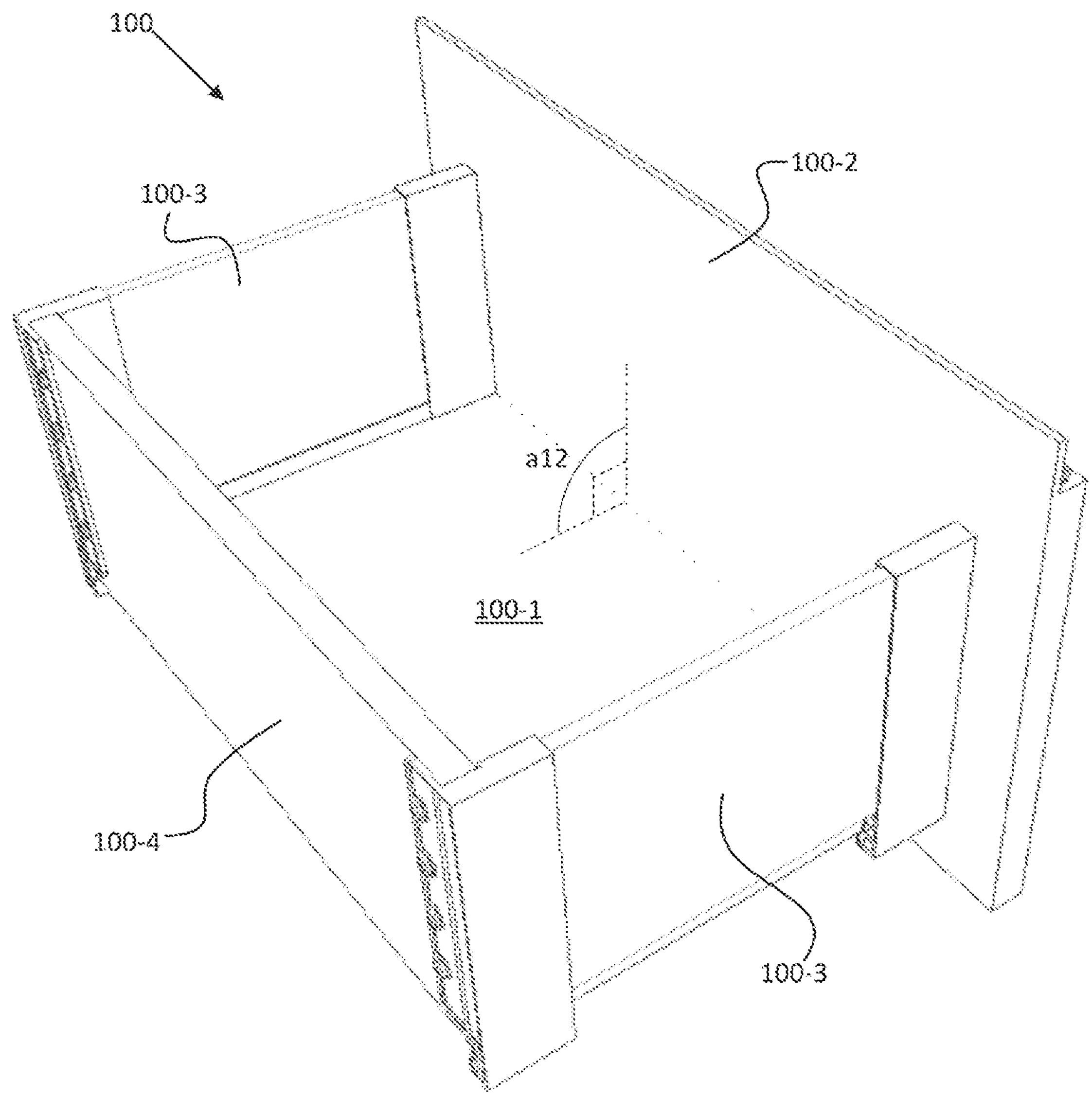
FIG. 1 shows a drawer in accordance with an embodiment of the invention.

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

One of the application areas of the invention is the mounting of front panels to furniture drawers.

For furniture drawers where the fronts slide in from a vertical direction, a slide-in connection between the drawer front panel and bottom panel is not feasible. Thereby the common way to achieve this connection is with screws or glue. Sometimes screws together with an L-shaped bracket. Current technology is time consuming and requires use of tools. This complicates the process and is not installation friendly for a professional market. The current invention prevents the need to use any tools to install and remove the drawer fronts on any kind of dresser and cabinet. A lock is applied as there is a need to prevent vertical deflection of drawer bottom boards that potentially can be caused by heavy loads inside the drawer, Further, prevention of horizontal deflection of the drawer front board is sought in case of heavy loads inside the drawer.

In the invention, this part of the furniture assembly and installation process, can be done without the need of any tools. It also allows for easy change of one front panel with another due to maintenance or desired design change.

The invention will be discussed for furniture drawers in more detail with reference to the figures.

FIG. 1 shows a drawer 100 in accordance with an embodiment of the invention. The drawer 100 is an example of a part of a piece of furniture to which the invention may be applied. The drawer 100 comprises a first panel 100-1 (here the bottom plate), a second panel 100-2 (here the front panel), two side panels 100-3, and a back panel 100-4 as illustrated. In a typical drawer 100 the angle a12 between the front panel 100-2 and the bottom plate 100-1 is 90 degrees as illustrated. However, this is not essentially the case. Some drawers (maybe more stylish or modern) may have different angles between these panels 100-1, 100-2 and the invention still validly applies to such drawers.

In some applications it is desirable to be able to quickly replace the front panel 100-2 with another panel, which looks nicer or because of the old panel being damaged. This is where the invention provides for a convenient solution. Even if the invention may be advantageously used for mounting or replacing front panels to drawers, the invention is not limited to such applications at all. Any piece of furniture, which comprises panels that are to be mounted under an angle, may benefit from the mounting system in accordance with the invention.

Figure 2:
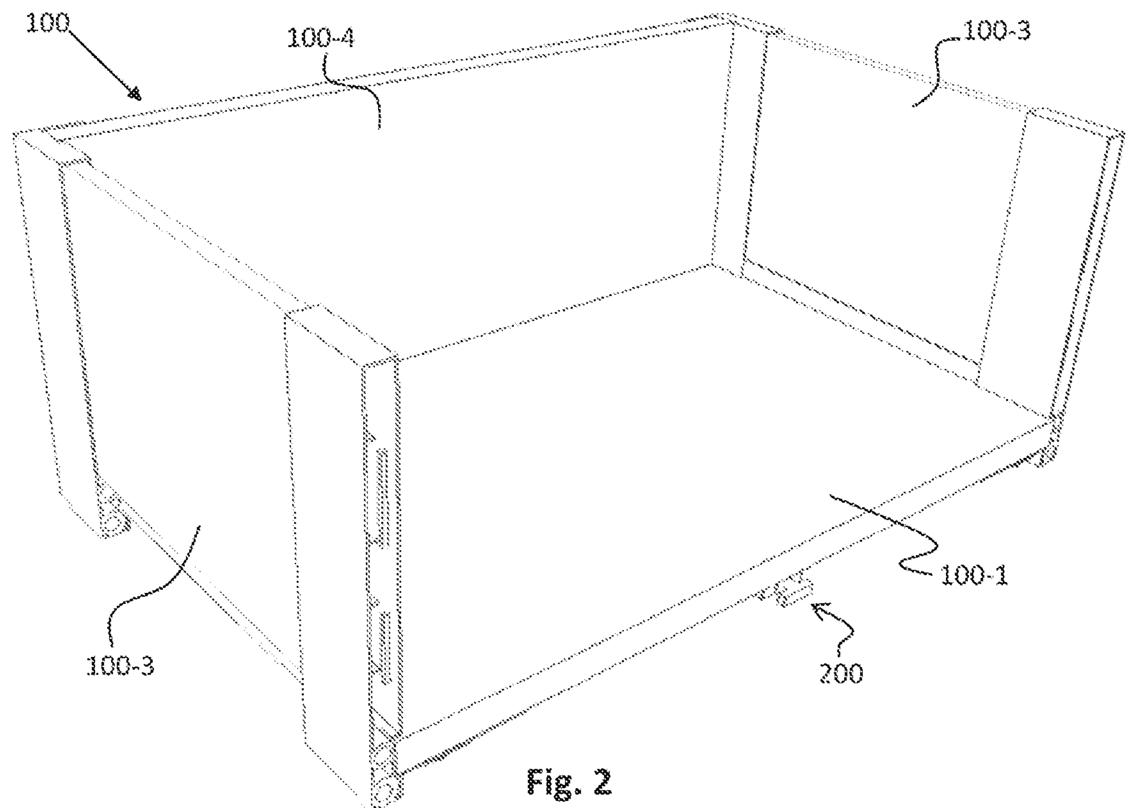
FIG. 2 shows the drawer of FIG. 1 with the front panel removed.

FIG. 2 shows the drawer 100 of FIG. 1 with the front panel 100-2 removed. Also the view is changed such that part of an embodiment of the mounting system 200 in accordance with the invention is visible.

Figure 3:
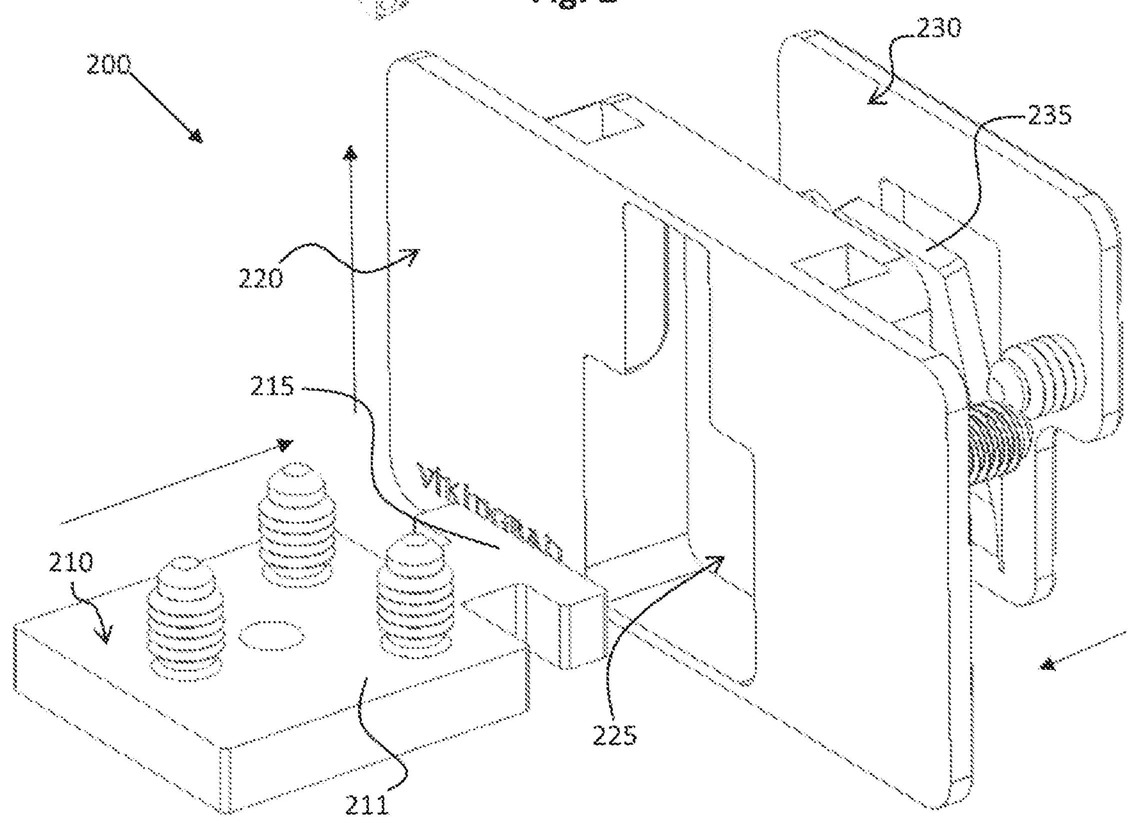
FIG. 3 shows an exploded view of the mounting system in accordance with another embodiment of the invention.

FIG. 3 shows an exploded view of this mounting system 200 in full. In this example the mounting system 200 comprises three parts, namely a bracket 210, a holder 220 and a locking member 230 as illustrated. The bracket 210 comprises a mounting portion 211 for being mounted to a panel (not shown), and a head portion 215 as illustrated. The holder 220 is provided with a opening 225 for receiving the head portion 215 of the bracket 210. The locking member 230 comprises a resilient member 235, which plays an important role in locking the bracket 210 after having been inserted. This will be explained with reference to the other figures.

Figures 4, 5:
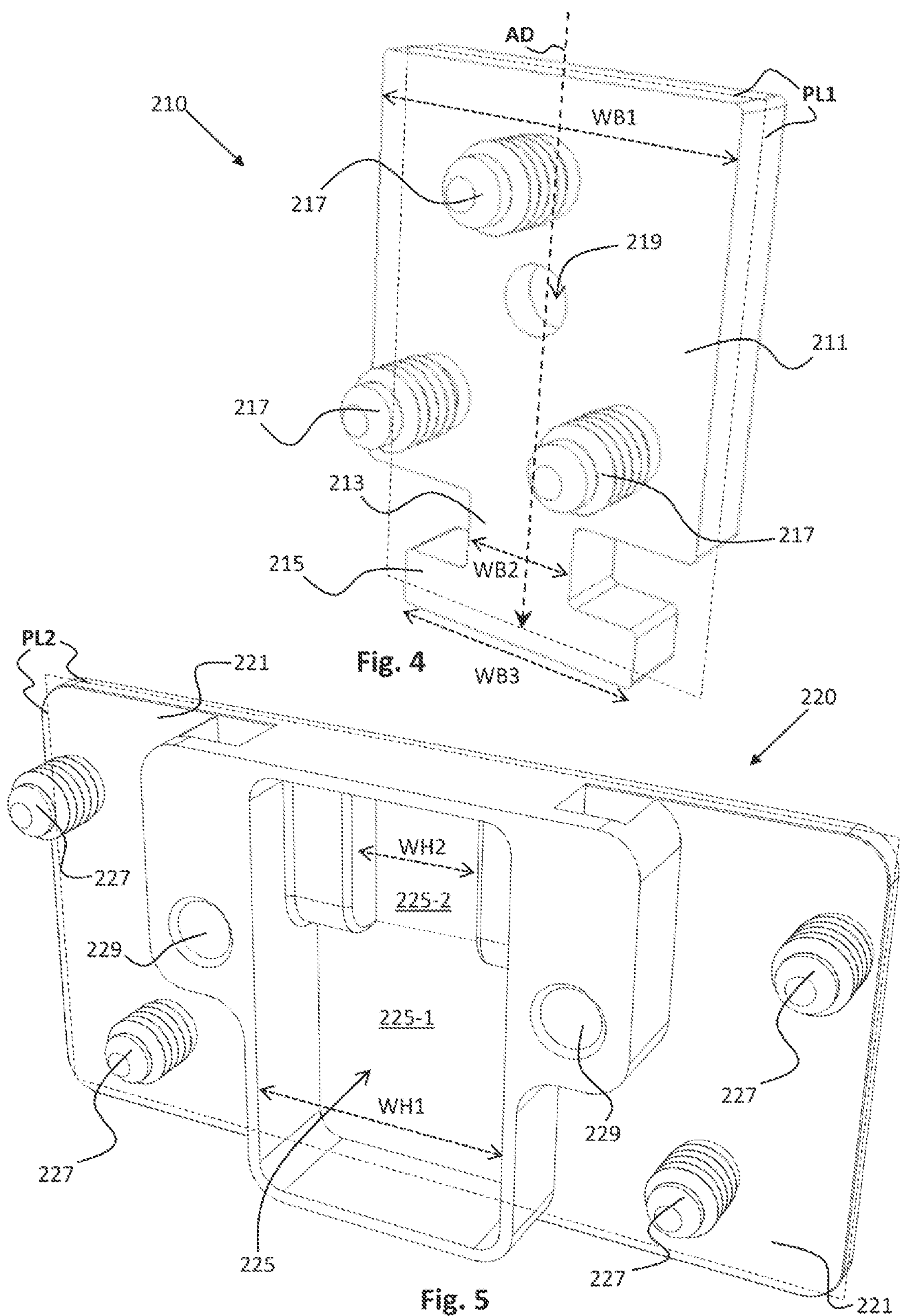
FIG. 4 shows the bracket of the mounting system of FIG. 3.
FIG. 5 shows the holder of the mounting system of FIG. 3.

FIG. 4 shows the bracket 210 of the mounting system 200 of FIG. 3. The bracket 210 comprises said mounting portion 211 and head portion 215. The mounting portion 211 is provided with a plurality of fixation elements 217, here plugs as an example, which are to be inserted into corresponding holes (not shown) in a respective panel (not shown) onto which the bracket 210 is to be mounted. The mounting portion 211 is further provided with a screw hole 219 such that the bracket 210 can be fixed to said panel by using a screw extending through the screw hole 219 and into said panel. Between the head portion 215 and the mounting portion 211 there is provided a neck portion 213. The mounting portion 211 is designed with a certain size and width WB1 to facilitate a proper mounting to said panel. An important feature of the invention is that the neck portion 213 has a width WB2 that is smaller than the width WB3 of the head portion as illustrated. FIG. 4 further illustrates what is meant with the first plane PL1 in the claims. The bracket 210 is clearly flat in its shape (defining the mounting portion 211, the narrowed neck portion 213 and the head portion 215) extends in a first plane PL1 as illustrated. Furthermore, FIG. 4 illustrates what is meant with the axial direction AD in the claims. The axial direction AD is defined within the first plane PL1 and extends in the direction as illustrated. The axial direction AD illustrates in how the mounting portion 211, the neck portion 213 and the head portion 215 are ordered within the first plane PL1.

FIG. 5 shows the holder 220 of the mounting system 200 of FIG. 3. It must be noted that the holder 220 in FIG. 5 is viewed from its backside contrary to FIG. 3 where it is seen from it frontside. The reason for this change in view angle is to show some further details of the holder 220. The holder 220 comprises a mounting plate 221 that is provided with a plurality of plugs 227 as earlier discussed and further two mounting holes 229 that are configured for receiving respective plugs 237 from the locking member 230 (discussed with reference to FIG. 6) that are configured for being inserted in corresponding holes (not shown) in a respective panel (not shown). The mounting plate 221 is provided with said opening 225 for receiving the head portion 215 of the bracket 210. The opening 225 has a special form in that it comprises a first part 225-1 having a first width WH1 and a second part 225-2 adjacent the first part 225-1 having a second width WH2 smaller than the first width WH1 as illustrated. FIG. 5 further illustrates what is meant with the further plane PL2 in the claims. The holder 220 extends in the further plane PL2 and has an opening 225 with a shape that extends in the further plane PL2 as illustrated.

With reference to FIGS. 4 and 5 the following is mentioned. The width WB3 of the head portion 215 is to be designed smaller than or equal to the width WH1 of the first part 225-1 of the opening 225, but larger than the width WH2 of the second part 225-2 of the opening 225. Furthermore, the width WB2 of the neck portion 213 is to be designed smaller than then width WH2 of the second part 225-2 of the opening 225. Preferably, but not essentially, the width WB1 of mounting portion 211 is designed to be broader than width WH1 of first part 225-1 of opening 225 for reasons discussed in the introduction of this specification.

Figure 6:
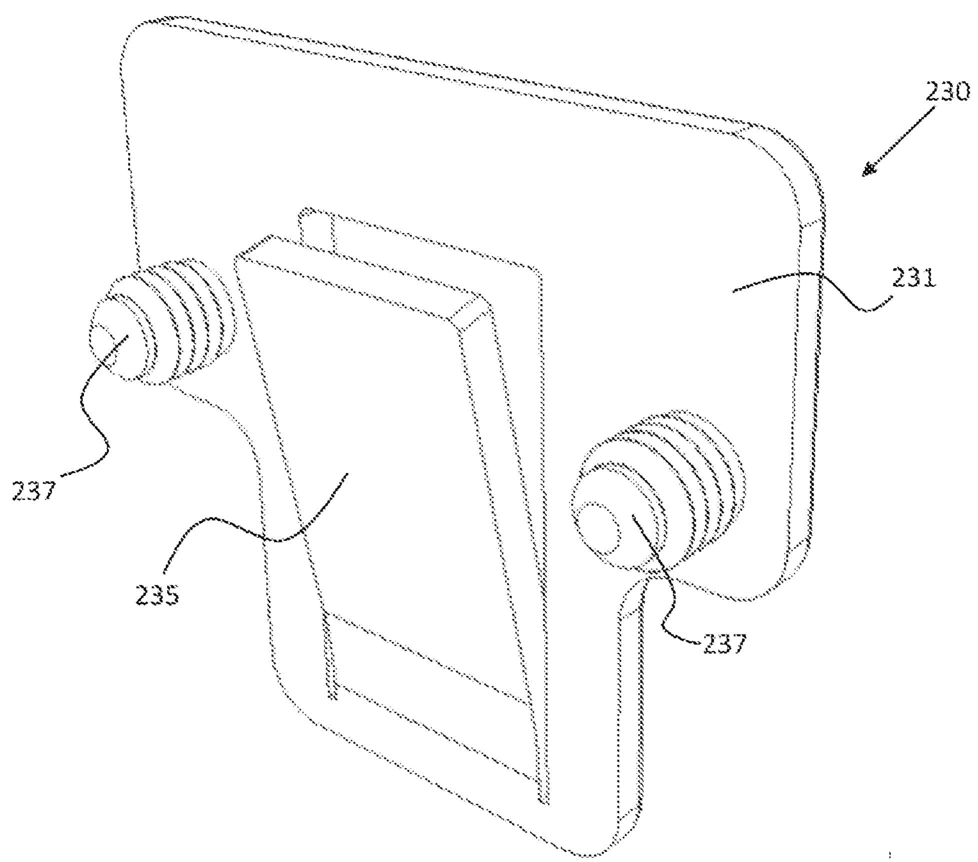
FIG. 6 shows the locking member of the mounting system of FIG. 3.

FIG. 6 shows the locking member 230 of the mounting system 200 of FIG. 3. The locking member 230 comprises a mounting frame 230 in which the resilient member 235 is mounted as illustrated. The mounting frame 230 is provided with a plurality of plugs 237 as illustrated. These plugs 237 are to be inserted in said mounting holes 229 in the holder 220 in FIG. 5.

Figure 7:
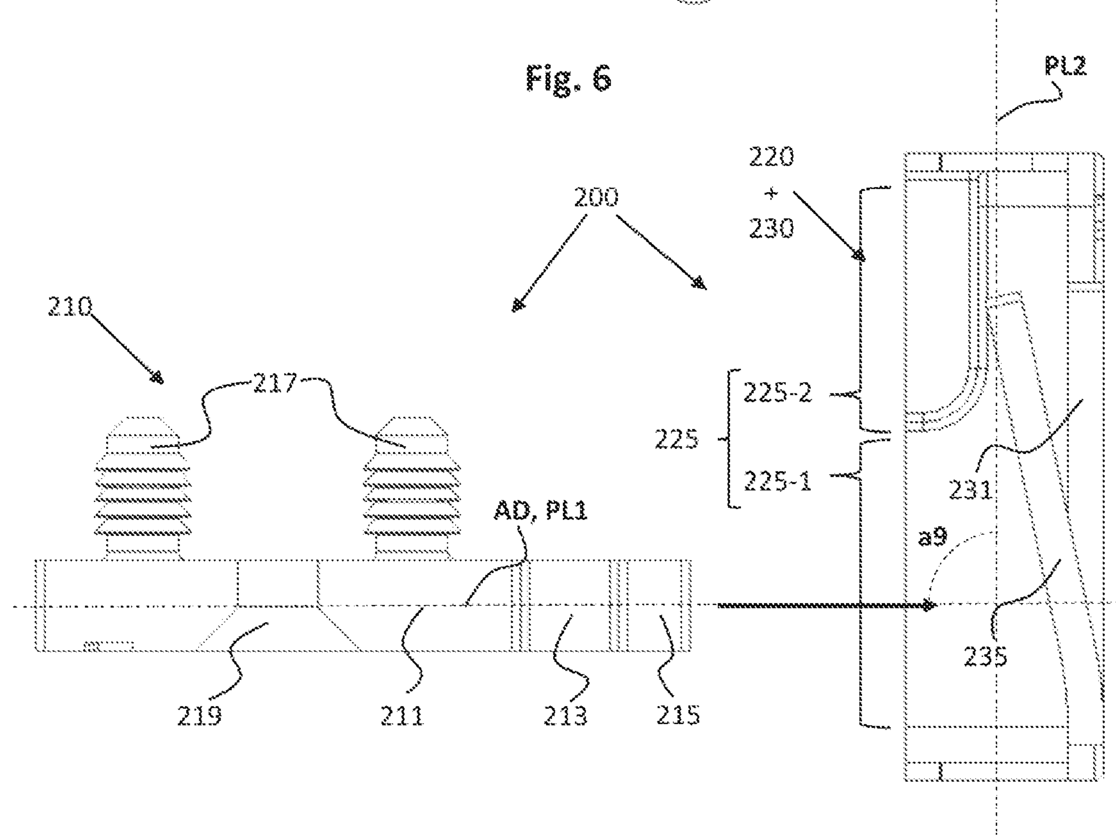
FIGS. 7 to 9 show a method of using the mounting system of FIG. 3, and FIGS. 10 to 12 show a method of using the bracket of FIG. 3 to mount two panels under an angle in furniture.
Figure 8:
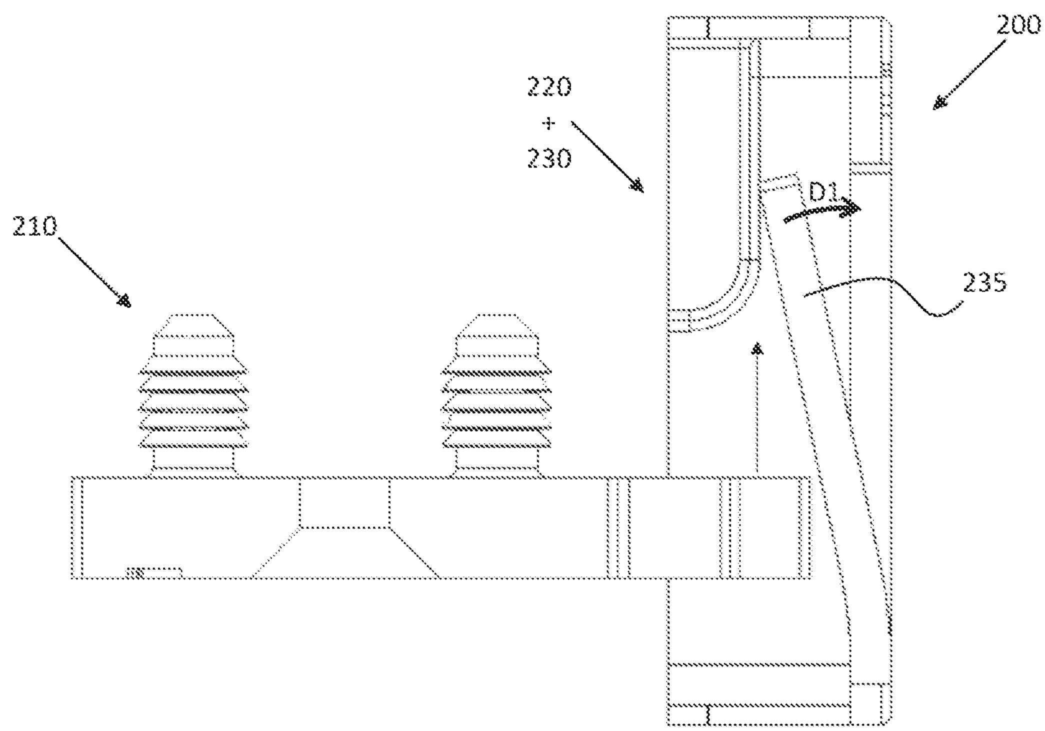
Figure 9:
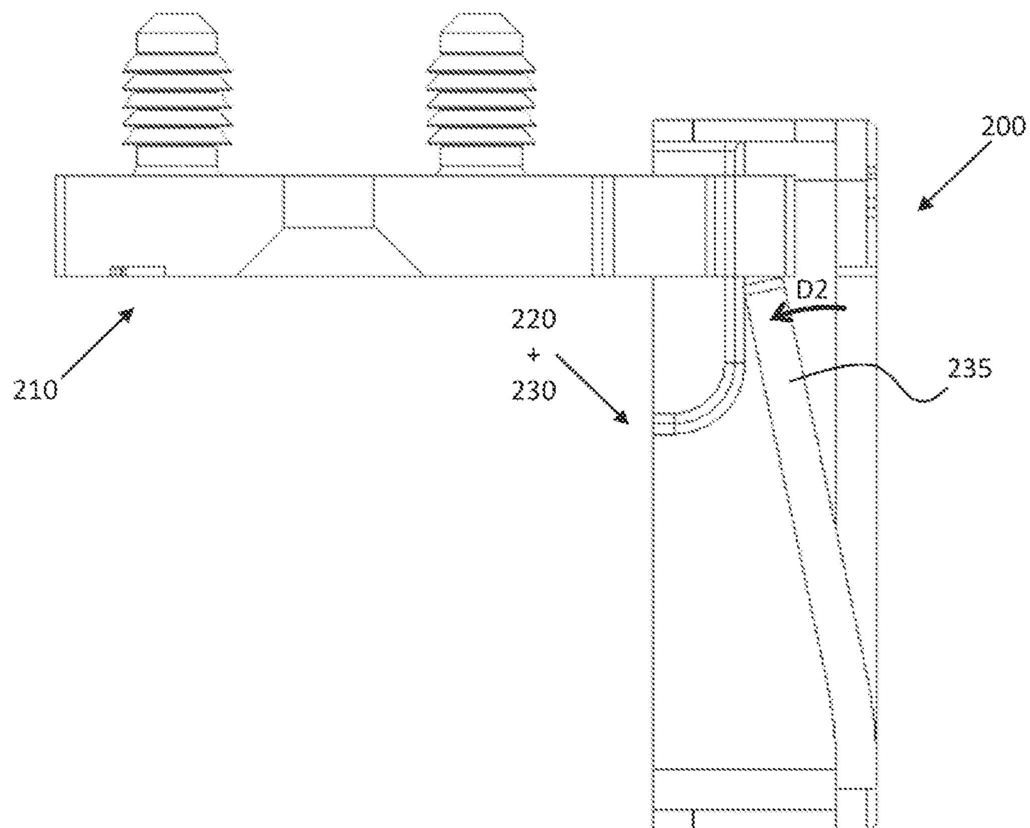

FIGS. 7 to 9 show a method of using the mounting system 200 of FIG. 3. In FIG. 7 there is shown the mounting system 200 including all its parts 210, 220, 230. In FIG. 7 the locking member 230 has been mounted at the back side of the holder 220. It can be observed that the resilient member 235 is bent in the direction of the opening 225. In FIG. 7 the bracket 210 is going to be inserted into the first part 225-1 of the opening 225 as illustrated by the arrow. This position is also called the unlocked position in the claims. FIG. 7 further illustrates what is meant with the axial direction AD (in plane with the first plane PL1) of the bracket 210 being inserted in the hole 225 under an insertion angle a9 with the further plane PL2 as mentioned in the claims. This solution clearly differs from the in-plane click-solutions of the prior art.

In FIG. 8, the bracket 210 is moved in the direction as illustrated by the arrow. During this sliding movement of the bracket 210 relative to the holder 220 the resilient member 235 is pressed in as illustrated by moving direction D1.

In FIG. 9, the bracket 210 is moved completely to the end of the second part of the opening 225, which allows the resilient member 235 to move back to its original position (due to resilient forces) in the moving direction D2. A "click" sound may be heard when this happens. The result is that the bracket 210 is locked in its position, also referred to as the locking position in the claims. In operational use the resilient member 235 not only keeps the bracket 210 in place, it also forms a support for the bracket 210.

Figure 10:
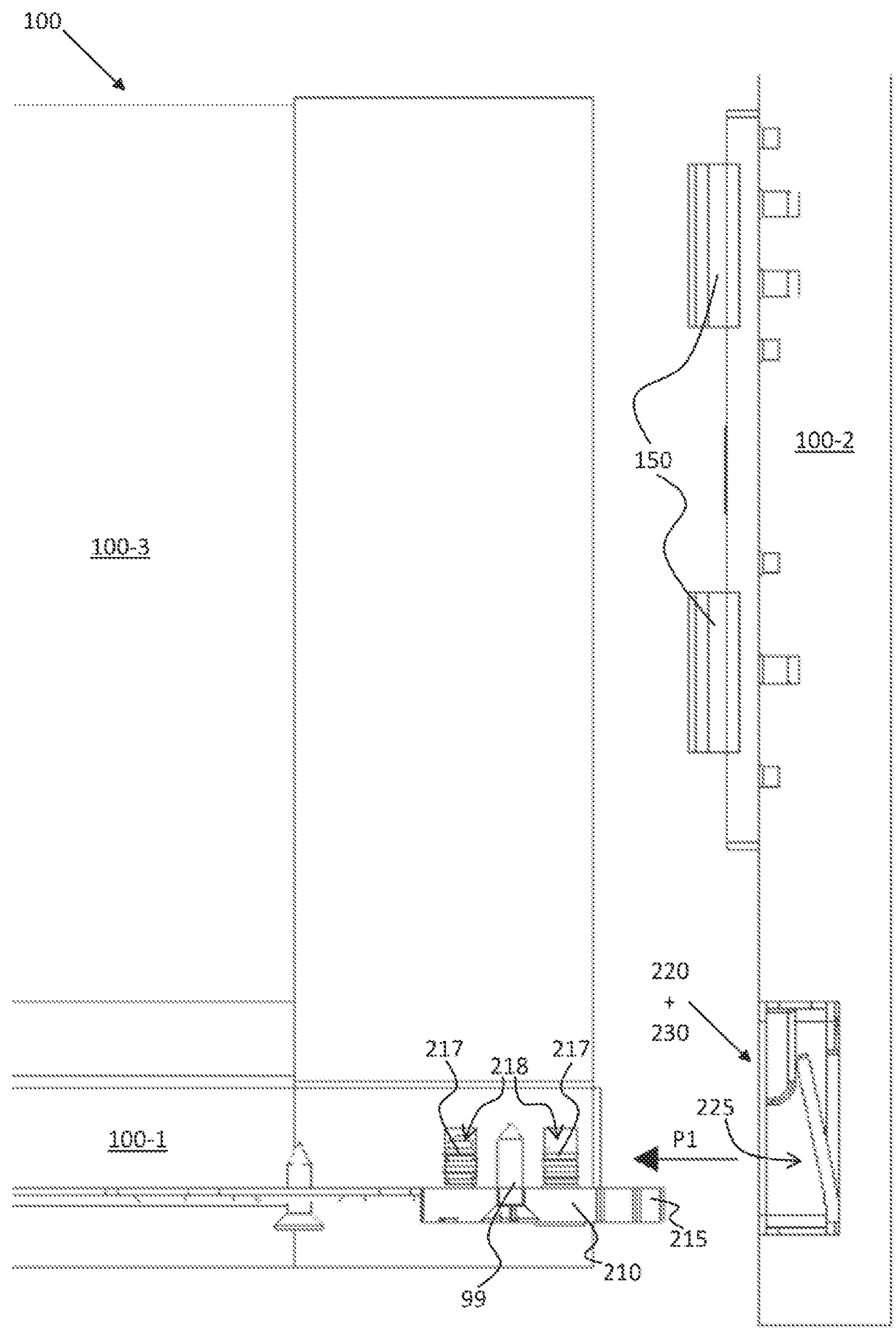
Figure 11:
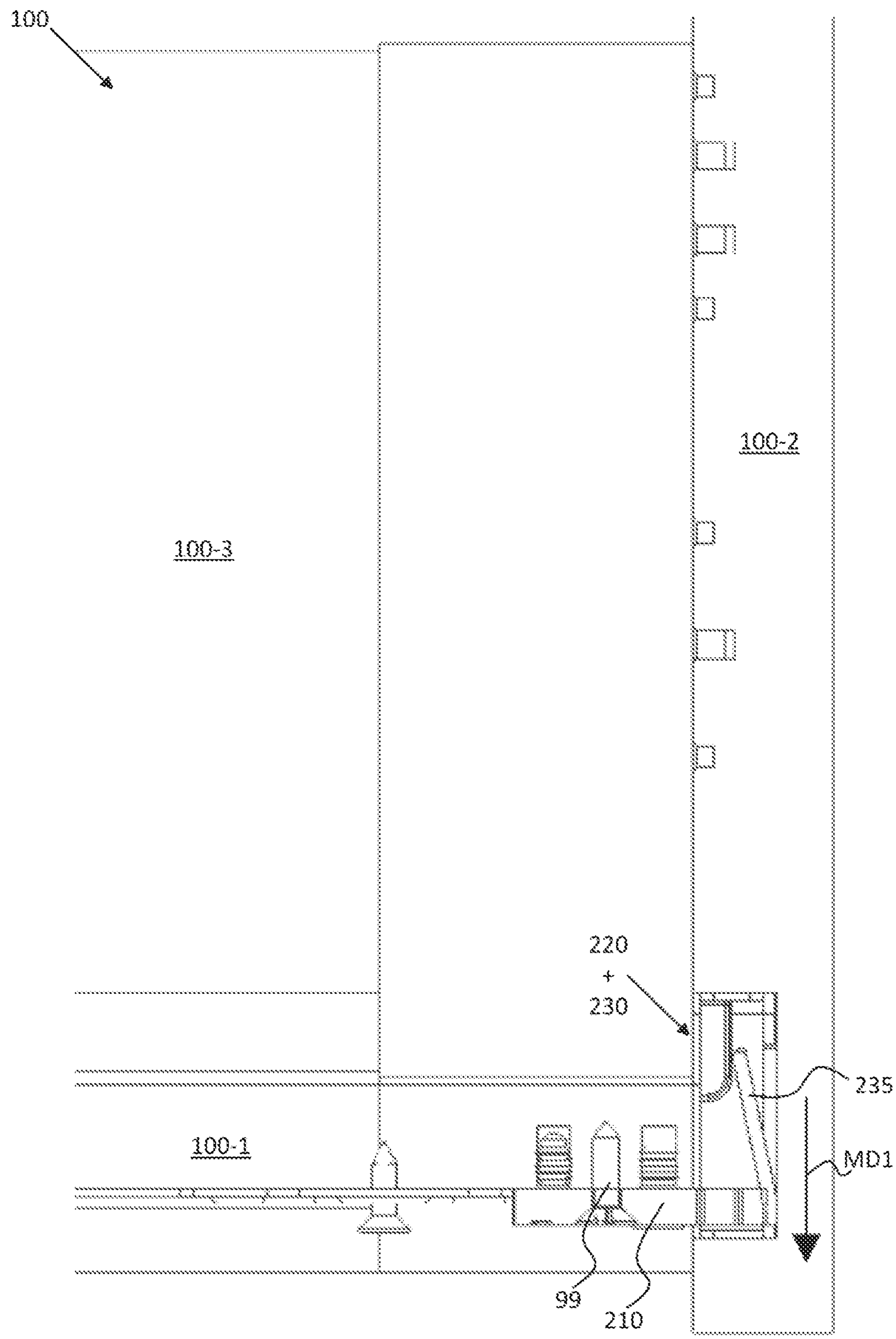
Figure 12:
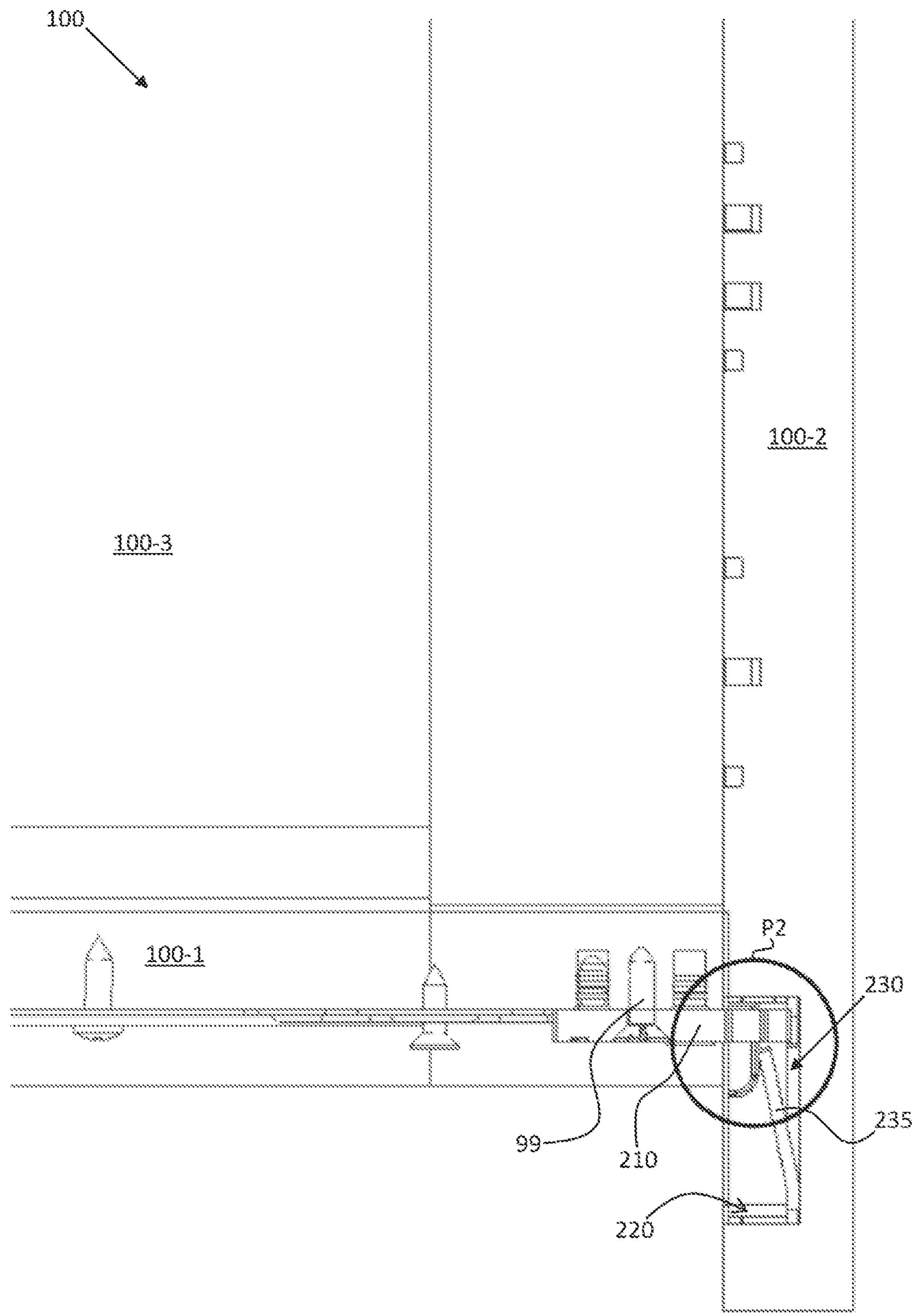

FIGS. 10 to 12 show a method of using the bracket of FIG. 3 to mount two panels under an angle in furniture.

In FIG. 10 there is shown a drawer 100 comprising a bottom panel 110-1, and side panels 100-3 similar to FIG. 2. The front panel 100-2 is to be mounted to the drawer 100. The front panel 100-2 is provided with the holder 220 and locking member 230 in a trench as illustrated. The bottom panel 110 is provided with the bracket 210. The bracket 210 has been mounted to the bottom panel 110 by means of a screw 99 as illustrated. The respective plugs 217 extend in corresponding holes 218 as illustrated. The reason for choosing three hole 218 placed in a triangle is to avoid mounting the bracket 210 in a wrong orientation, for example upside down. The same applies for the holder 220. The front panel 100-2 has also been provided with further mounting connectors 150 that are configured to engage with specially designed recesses in the rim of the side-panels 100-3. These mounting connectors 150 do not form part of the current invention. In the figure the front panel 100-2 is moved in the direction of the arrow towards to other panels 100-1, 100-3.

The bracket 210 and the holder 220 are positioned in their unlocked position P1 such that the bracket 210 may enter the opening 225. At the end of this step the front panel 100-2 will be completely abutting the side panels 100-3 and the bottom panel 100-1.

In FIG. 11 the front panel 100-2 is moved downward relative to the drawer 100 as indicated by the arrow MD1. During this movement the bracket 210 moves upwards relative to the holder 220 and locking member 230 pressing in the resilient member 235.

In FIG. 12 the front panel 100-2 has been moved completely down towards it locking position P2 where the resilient member 235 has moved to its original position, producing a "click"-sound and providing a support for the bracket in the vertical direction as discussed earlier in this specification.

So, with reference to FIGS. 10-12 it is mentioned that when the front panel 100-2 of the drawer 100 is installed, the front panel 100-2 is slid in a vertical direction. When the front panel 100-2 slides on the drawer 100, the mounting system 200 connects bottom panel 100-1 and the front panel 100-2 and when the front panel 100-2 in in place, the mounting system 200 "clicks" and the front panel 100-2 cannot be removed from the drawer 200 before the mounting system is opened by pressing a finger on the resilient member 235 and then the front panel 100-2 may be slid in the opposite direction as it was installed.

The invention can be used in a wide range of applications, such as bathroom furniture cabinets, kitchen cabinets, dressers, wardrobes, clothes, cup boards, attires, etcetera. The invention is basically applicable to every product that has a drawer with a separate drawer front and drawer bottom board. Furthermore, the invention may be applied in different areas than front panels of drawers. Basically any panel of a drawer or cupboard may be mounted in the manner as disclosed in this patent specification and claims.

The particular embodiments disclosed above are illustrative only, as the invention may be modified and practiced in different but equivalent manners apparent to those skilled in the art having the benefit of the teachings herein. For example, variations are possible in the way parts are connected or coupled. The person skilled in the art may easily find alternative solutions for tightening, tensioning and mounting parts. The invention covers all these variants as long as they are covered by the independent claim. No limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article “a” or “an” preceding an element does not exclude the presence of a plurality of such elements. The mere fact that certain measures are recited in mutually different dependent claims does not indicate that a combination of these measures cannot be used to advantage. In the device claims enumerating several means, several of these means may be embodied by one and the same item of hardware.

The invention claimed is:

1. A mounting system for mounting a first panel to a second panel under an angle, wherein the mounting system comprises:

a bracket having a mounting portion and a head portion connected to the mounting portion via a narrowed neck portion, wherein the mounting portion, the head portion and the narrowed neck portion are flat and define a shape extending in a first plane, wherein the head portion points in an axial direction of the bracket within the first plane, wherein the mounting portion is configured for being mounted to the first panel;

a holder having an opening having a shape being defined in a further plane, the holder being configured for being mounted to the second panel, wherein the shape of the opening comprises a first part for receiving the head portion of the bracket in an unlocked position, wherein the holder and the bracket are configured such that, in operational use of the mounting system, the bracket may be inserted in the opening in such a way that the axial direction of the bracket is under an insertion angle with the further plane, wherein the shape of the opening comprises a second part adjacent to the first part and being narrower than the first part, the second part being configured for receiving the narrowed neck portion in a locking position when the bracket is slid from the first part to the second part in a direction substantially parallel to the further plane, and a locking member for holding the bracket in the locking position after that it has been inserted in the holder and slid in the locking position, wherein the locking member comprises a resilient member that is positioned within the opening in operational use and being configured for being pressed in when the bracket is being slid from the unlocked position to the locking position and for taking in its original position when the bracket is fully in the locking position for providing a stable support under the bracket, wherein the resilient member is configured and placed such that is accessible through the opening for allowing being pressed in by a finger or tool thereby releasing the bracket and allowing it to be slid back to its unlocked position.

2. The mounting system according to claim 1, wherein the mounting portion of the bracket is wider than the head portion.

3. The mounting system according to claim 2, wherein the locking member and the holder are formed as separate parts that are configured to be mounted together.

4. The mounting system according to claim 2, wherein the locking member and the holder are formed as one part.

5. The mounting system according to claim 1, wherein the locking member and the holder are formed as separate parts that are configured to be mounted together.

6. The mounting system according to claim 1, wherein the locking member and the holder are formed as one part.

7. Furniture comprising:

a first panel and a second panel mounted together under an angle by a mounting system comprising a bracket having a mounting portion and a head portion connected to the mounting portion via a narrowed neck portion, wherein the mounting portion, the head portion and the narrowed neck portion are flat and define a shape extending in a first plane, wherein the head portion points in an axial direction of the bracket within the first plane, wherein the mounting portion is configured for being mounted to the first panel;

a holder having an opening having a shape being defined in a further plane, the holder being configured for being mounted to the second panel, wherein the shape of the opening comprises a first part for receiving the head portion of the bracket in an unlocked position, wherein the holder and the bracket are configured such that, in operational use of the mounting system, the bracket may be inserted in the opening in such a way that the axial direction of the bracket is under an insertion angle with the further plane, wherein the shape of the opening comprises a second part adjacent to the first part and being narrower than the first part, the second part being configured for receiving the narrowed neck portion in a locking position when the bracket is slid from the first part to the second part in a direction substantially parallel to the further plane, and a locking member for holding the bracket in the locking position after that it has been inserted in the holder and slid in the locking position, wherein the locking member comprises a resilient member that is positioned within the opening in operational use and being configured for being pressed in when the bracket is being slid from the unlocked position to the locking position and for taking in its original position when the bracket is fully in the locking position for providing a stable support under the bracket, wherein the resilient member is configured and placed such that is accessible through the opening for allowing being pressed in by a finger or tool thereby releasing the bracket and allowing it to be slid back to its unlocked position;

wherein the first panel is provided with the bracket and the second panel is provided with the holder and the locking member.

8. The furniture according to claim 7, wherein the first panel is also provided with side panels, wherein the second panel is provided such that it abuts both the first panel as well as the side panels for forming a container or drawer.

9. The furniture according to claim 7, wherein the mounting portion of the bracket is wider than the head portion.

10. The mounting system according to claim 7, wherein the locking member and the holder are formed as separate parts that are configured to be mounted together.

11. The mounting system according to claim 7, wherein the locking member and the holder are formed as one part.

* * * * *